Figure 1:
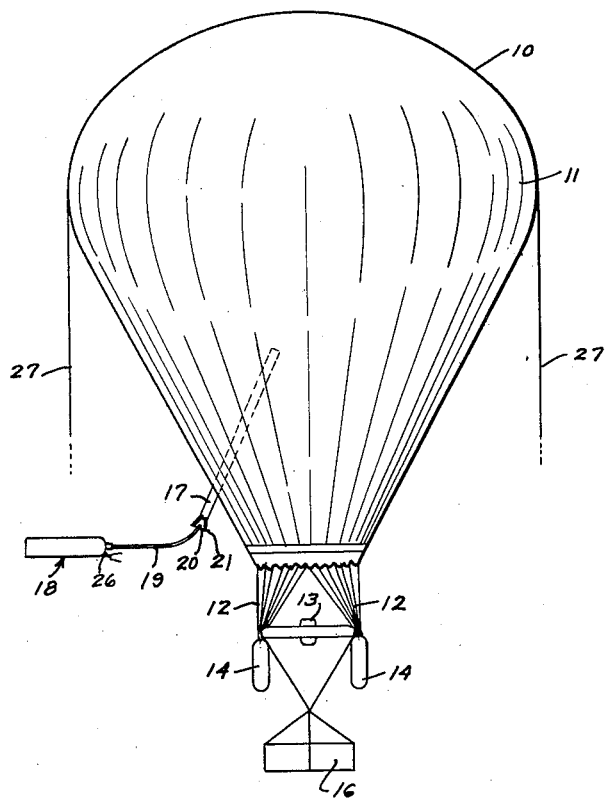

April 14, 1964

P. E. YOST 3,128,969

CARTRIDGE INFLATED BALLOON

Filed Dec. 22, 1961

INVENTOR.
Paul E. Yost
BY
ATTORNEYS

3,128,969
CARTRIDGE INFLATED BALLOON

Paul E. Yost, Sioux Falls, S. Dak., assignor to Raven Industries, Inc., Sioux Falls, S. Dak., a corporation of South Dakota
Filed Dec. 22, 1961, Ser. No. 161,669
1 Claim. (Cl. 244—98)

The present invention relates to improvements in balloons and particularly to an improved apparatus and method for rapidly inflating a hot air balloon.

The size of balloons which can be flown practically has increased and balloons of 10,000,000 cubic feet have been constructed and flown. Balloons carrying pay loads of as much as 9,000 pounds have been flown, and experiments show that heavier loads can be carried. These large balloons have heretofore been almost universally used with a lighter-than-air lifting gas such as hydrogen or helium which has been provided in compressed gas containers. The transfer of the gas from the containers to the balloon envelope necessitates long periods of inflation before the balloon is released and requires complicated connections and conduits. It also requires that the balloon be filled when there is a minimum amount of surface wind and requires that the balloon be held by strong lines during inflation. This is frequently meant that the balloons can be filled only in shielded areas such as deep depressions in the ground or behind wind screens, and during the early morning hours or times of day when there is substantially no surface wind. These conditions are not always available such as when a balloon has to be launched at a given time or at a given location such as aboard ship where substantially no shelter is available for a large balloon surface. These difficulties of launching which necessarily accompany slow initial inflation hamper inflation and launching of load carrying and manned flight balloons of all sizes.

Developments in materials and balloon equipment have made practical the use of hot air balloons for carrying large pay loads. These are capable of maintaining a balloon in flight over a long period of time at a controlled altitude, with the gas generating system being carried with the balloon. In hot air balloons it is still essential to use care at launching to protect the balloon from the effects of the wind during inflation. Even relatively light gusts of wind can twist the balloon envelope and damage the balloon or the associated equipment for launching and flying the balloon.

An object of the present invention is to provide an improved inflation system which makes it possible to very rapidly inflate a balloon envelope thus avoiding the problems which arise with conventional methods of inflation which require long periods of time.

A further object of the invention is to provide an improved method and apparatus for the very rapid inflation of a balloon envelope for launching wherein the apparatus is convenient and compact for storage and handling and can be used in combination with other inflation systems which provide lighter-than-air gases or hot air for sustaining flight after launching.

An object of the invention is to provide a balloon and launching inflation equipment therefor which are compact and lightweight for easy storage and transportation, which require minimum equipment for handling and operation, and which make it possible for a balloon to be inflated with sufficient free lift for launching in a matter of minutes wherein conventional inflation equipment has required much longer periods of time.

A still further object of the invention is to provide rapid inflation equipment which is sufficiently compact and convenient that it can be air-borne with an uninflated balloon and the uninflated balloon inflated to start a flight at high altitudes.

Figure 2:
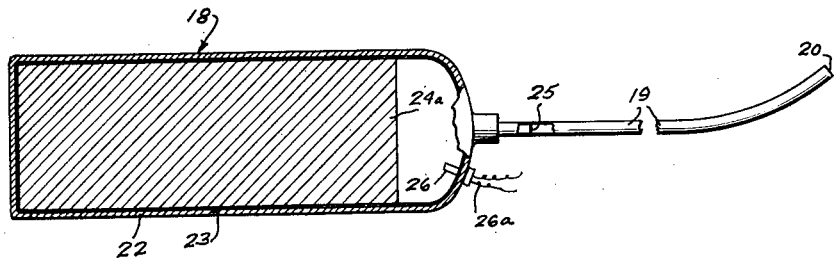

Other objects, advantages and features will become more apparent with the teaching of the principles of the invention in connection with the disclosure of the preferred embodiment thereof in the specification, claim and drawings in which:

FIGURE 1 is an end elevational view shown in somewhat schematic form of a balloon assembly constructed and operated in accordance with the principles of the present invention; and FIGURE 2 is a sectional view of the rapid inflation mechanism of FIGURE 1.

As shown on the drawings:

FIGURE 1 illustrates a balloon 10 which is substantially inflated just before launching. The balloon is formed of a suitable lightweight material which may be cut in gores 11 joined to each other along their edges by seams to form the balloon envelope. The lightweight material may be of thin plastic such as polyethylene on the order of .001 inch thick and this or similar material will be used if the balloon is to be used for a single flight such as for carrying instrumentation aloft for a scientific flight. For very high altitudes however the balloon at launching will not have the appearance of the balloon at FIGURE 1, but a balloon of a vary large capacity will be used with a relatively small bubble of lifting gas at its top end at launching and this gas will expand as the balloon ascends to higher altitudes.

The balloon 10 which is illustrated is preferably a load carrying balloon to be used for carrying relatively heavy loads and will not be used to ascend to very high altitudes. For this purpose a reusable balloon envelope may be provided formed of a scuff and tear resistant material with an outer layer formed of a woven material such as nylon or cotton backed by an inner thin layer of gas impervious plastic such as Mylar. The balloon illustrated is a hot air balloon wherein the lifting gases are provided by heated air and gases rather than lighter-than-air gases such as helium or hydrogen.

At the lower end of the balloon are load lines suitably secured to the material at the lower end and supporting a burner 13 supplied with fuel from fuel containers 14. The burner 13 provides lift sustaining gas and the heated burning gases with a mixture of air pass upwardly into an opening 15 at the lower end of the balloon 10. Beneath the burner the load lines support a load 16.

Heated gas for very rapidly inflating the balloon and providing sufficient free lift for launching is obtained from a propellant container 18. The container 18 is filled with a relatively fast burning propellant, as will be described later in greater detail, and the gases from the burning propellant are delivered out through a propellant conduit 19 through a nozzle 20 and mixed with air by an aspirator 21. The air and gases are delivered through an inflation conduit 17 which is secured to an opening in the balloon side wall and leads into the balloon interior. The inflation conduit 17 provides a convenient conduit for the flow of gases and air through the balloon side wall, and delivers the gases to the inside of the balloon where they are not directed against any one portion of the balloon material but are diffused within the balloon interior and mixed with gases therein.

Thus launching gases for rapid inflation to provide free lift for launching the balloon are provided from the container 18, and sustaining gases are provided by the burner 13, to keep the balloon in flight.

The propellant container 18 has a metal cylindrical outer wall 22 lined with an inhibitor 23 and it contains a block of solid propellant 24 with a radial exposed end face 24a. At the upper end of the container opposite the exposed face 24a is an electrically operated igniter 26. The discharge line 19 may be provided with a temporary closure such as a blow-out disk 25 which will rupture due to pressure increase when the igniter 26 ignites the propellant 24.

The discharge nozzle is held in the aspirator by suitable means and various forms of aspirators may be employed so that outside air will mix with the discharging gases to reduce their temperature and increase the volume of gas which is inflating the balloon.

The propellant 24 and the size of the container 18 are chosen relative to the volume of the balloon 10 so that when the propellant is consumed the balloon will have substantially sufficient free lift to support the pay load 16 and be launched. The propellant and container size are also chosen so that the propellant has a burning rate which will consume the propellant in a predetermined time. A rapid inflation will occur and the propellant is preferably consumed in a matter of several minutes. In some circumstances where slightly more time is available, such as when the rapid inflation container 18 is air-borne with the uninflated balloon, and the balloon is inflated aloft, a somewhat longer inflation period can be employed.

The solid propellant may be a monopropellant of various types, such as a mixture of ammonium perchlorate and a mixture of organic fuel such as rubber, or can be a homogeneous charge of special oxidizing organic chemicals such as nitrocellulose or nitroglycerin. Once the propellant is ignited the radial end surface burns smoothly in an axial direction at a uniform rate. A solid propellant is chosen for this preferred form since it requires no pump or pressurization for the fuel and is mechanically simpler to operate and handle. The solid fuel is more storable and more immediately ready for use. The chamber confines the reaction products of combustion and is made of high strength material and is protected from excessive heat by the internal insulating layers of inhibitor which may be a slow burning propellant having a low burning temperature or ceramic insulator. The propellant can be pasted or cast directly into the chamber case which is provided with a filling opening, not shown.

The igniter 26 is electrically energized by leads 26a which are connected to a suitable electrical starter. For ground inflation a battery and switch arrangement may be provided, and similar equipment may be provided for air-borne inflation. The igniter is a small amount of sensitive primer powder which causes ignition gases to sweep past the radial end of the main propellant charge.

It is also contemplated that the propellant charge and container may be carried within the balloon in certain circumstances. To avoid damage to the balloon material the balloon usually will be inflated with air concurrently with the inflation by hot gases emerging from the container within the balloon. For example, in air-borne inflation, a balloon may be deployed with a large apex opening 15, and held upright by a drag parachute at the top so that air enters the bottom by ram effect as the balloon is pulled downwardly by its load. After partial inflation has occurred through ram effect, the propellant will be ignited and the discharging gases will rapidly increase the temperature of the air within the balloon to create the free lift needed for supporting the pay load 16.

It is also contemplated that other forms of propellant fuel may be used such as liquid fuel or a mixture of fuel and oxidizer fed from separate tanks. In this case the fuel and oxidizer will be mixed in a burner and the burning gases will be mixed with air in an aspirator to cool them before inflating into the balloon.

It is essential that the gas be delivered to the balloon at a temperature which does not damage the balloon material. With a discharge into the center of the balloon the discharge temperature of the mixed air and gases can be slightly higher than that tolerated by the balloon material since cooling will occur at the outer skin surface of the balloon. A safe gas temperature within the balloon for a balloon material formed of laminated Mylar film and nylon cloth is 250° F. Other balloon materials can sustain higher temperatures on the order of a safe operating temperature of 400° F. For example an organic fiber cloth is available under the trademark DuPont HT-1, which retains 85% of its strength at 500° F. The temperature of the gas will be controlled by the selection of an aspirator which will mix sufficient air with the burning gases to lower the temperature of the gases delivered to the balloon to the proper degree. Control of temperature can also be obtained by the selection of propellants, and if separate fuels and oxidizers are employed temperature can be controlled to a degree by varying the mixture ratio.

In operation, for a ground launching balloon, a propellant container of a predetermined size relative to the size of the balloon is positioned to discharge into the aspirator 21 with the gases flowing into the inflation conduit. The propellant is ignited by the igniter 26, and the balloon rapidly inflated within the matter of minutes. Preferably an inflation at less than three minutes is obtained. When the propellant has burned to balloon will have adequate free lift for launching, and during inflation the balloon is held in place by guy lines 27 or by holding down on the load 16. For launching the inflation tube 17 is withdrawn and the opening through which the tube was inserted closed, or the tube itself can be tied off. The balloon is then released and the burner 13 is ignited for delivering flight sustaining hot air and gases to the balloon through the opening 15. If desired, original inflation by the conduit 17 can take place with the conduit 17 inserted into the opening 15.

Thus it will be seen that I have provided an improved mechanism and method for the rapid inflation of hot air balloons, which meet the objectives and advantages above set forth. The mechanism is compact for storage and use and can be employed in substantially any environment. With fast inflation it is possible to use balloons for purposes and for uses heretofore impractical.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

A hot air balloon assembly with a ground inflation and an air inflation mechanism comprising in combination, a hot air balloon including a balloon envelope having a predetermined volume sufficient to carry and maintain a payload of a given size aloft, means for supporting the payload on the balloon envelope, a portable ground inflation gas generator having a closed container with a charge of combustible propellant therein being of a size for generating sufficient heated combustion gases for inflating said balloon envelope to provide adequate free lift for carrying the balloon aloft and having a burning time to be consumed in less than three minutes, a propellant igniter in said container, a gas conduit leading from said container conducting hot combustion gas after the propellant has been ignited, an elongate inflation conduit adapted for insertion into an opening in the balloon envelope while the balloon is on the ground for delivering gas to the balloon envelope interior away from the balloon envelope material, an air aspirator between the inflation conduit and gas conduit providing an inlet for mixing a substantial volume of air with the gas to substantially increase the valume of gases delivered to the balloon envelope for rapid inflation and mixing sufficient air with the gas to diminish the temperature of the combustion gas to less than slightly higher than 500° F., and a gas generator mounted on the balloon envelope carried aloft therewith being of sufficient size for generating gas at a rate maintaining the balloon and payload aloft after inflation on the ground and maintaining the elevated temperature of gases delivered to the balloon by said ground inflation generator.

References Cited in the file of this patent

UNITED STATES PATENTS

| | | |
|---|---|---|
| 803,573 | Eubank | Nov. 7, 1905 |
| 1,866,079 | Blondin | July 5, 1932 |
| 2,413,985 | Manson et al. | Jan. 7, 1947 |
| 2,635,834 | Huch | Apr. 21, 1953 |
| 2,872,870 | Gey | Feb. 10, 1959 |
| 2,985,104 | Fox | May 23, 1961 |

FOREIGN PATENTS

| | | |
|---|---|---|
| 49,158 | Germany | Apr. 4, 1889 |
| 4,708 | Great Britain | of 1910 |